(12) United States Patent
Davies

(10) Patent No.: US 6,498,650 B1
(45) Date of Patent: Dec. 24, 2002

(54) ADAPTIVE OPTICS SYSTEM USING WAVEFRONT SELECTION

(75) Inventor: Donald W. Davies, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 263 days.

(21) Appl. No.: 09/684,101

(22) Filed: Oct. 6, 2000

(51) Int. Cl.[7] .................................................. G01B 9/02
(52) U.S. Cl. ....................................... 356/450; 356/521
(58) Field of Search ................................ 356/450, 521, 356/512, 496, 515, 499, 494, 488

(56) References Cited

U.S. PATENT DOCUMENTS 4,865,454 A * 9/1989 Lazzarini et al. ......... 250/201.9
5,684,545 A * 11/1997 Dou et al. ...................... 349/1

OTHER PUBLICATIONS

Francois Roddier, Curvature Sensing and Compensation: A New Concept in Adaptive Optics, Applied Optics, Apr. 1998, vol. 27, No. 7, pp. 1223–1225.
David L. Fried, Least–Square Fitting a Wave–Front Distortion Estimate to an Array of Phase–Difference Measurements, J. Opt. Soc., Mar. 1997, vol. 67, No. 3, pp. 370–375.

* cited by examiner

Primary Examiner—Samuel A. Turner
Assistant Examiner—Michael A. Lyons
(74) Attorney, Agent, or Firm—Harness, Dickey & Pierce, P.L.C.

(57) ABSTRACT

An optical system (10) for correcting wavefront aberrations of an optical beam (12). The beam (12) is received by an entrance pupil (14), where a portion of the beam (12) at the entrance pupil (14) is coupled off of the main beam (12) to be used as a reference beam (22). The reference beam (22) is taken from a small enough portion of the main beam (12) so that the temporal coherence of the reference beam wavefront is substantially in phase. The reference beam (22) is amplified by a coherent reference amplifier (24), expanded and collimated. The main beam (12) and the collimated beam (28) are applied to a beam splitter (16) that splits the main beam (12) and the reference beam (22) into two separate beam paths, where the main beam (12) and the reference beam (22) traveling along a common path are coupled together. One optical path from the beam splitter (16) is applied to a detector array (32) and the other optical path from the beam splitter (16) is applied to a light valve (40). Those portions of the main beam (12) that are more than 90° out of phase with the reference beam (22) destructively interfere at the detector array (32). The outputs of the detectors in the array (32) are measured by threshold electronics (36). The threshold electronics (36) cause the light valve (40) to attenuate the portions of the beam on the other path that are the destructively interfering portions of the main beam (12) and the reference beam (22) so those portions do not pass through the light valve (40). Therefore, only those portions of the main beam (12) that are substantially in phase with the reference beam (22) continue on through the receiver optics.

20 Claims, 1 Drawing Sheet

ADAPTIVE OPTICS SYSTEM USING WAVEFRONT SELECTION

BACKGROUND OF THE INVENTION

1. Field of the Invention

This invention relates generally to an optical system for correcting wavefront phase aberrations of a light beam and, more particularly, to an optical system for correcting wavefront phase aberrations of a light beam that employs a process of interfering a reference beam with the main beam to identify destructively interfering locations in the wavefront of the main beam that are then removed from the beam using a light valve.

2. Discussion of the Related Art

Certain types of optical transmission systems, such as optical communications systems, imaging systems, etc., transmit a coherent light beam carrying information through a medium, such as air. Because the light beam is coherent, the phase of the beam is substantially constant across the beam wavefront when it is generated. However, the medium typically corrupts the beam by introducing distortions to the beam that causes portions of the wavefront to have a different phase than other portions of the wavefront at any given instant in time. If this wavefront phase aberration was not corrected at the receiver, the light beam could not be effectively focused onto receiving optics, such as a fiber optic cable, and thus a significant intensity of the beam would be lost. Therefore, it is known in the art to correct wavefront aberrations at the receiver of an optical system of this type.

Different systems are known in the art to correct wavefront aberrations in an optical system of the type being described herein. Typically, these types of systems employ a wavefront sensor, such as a Schack-Hartman sensor, that measures the tilt of individual portions of the beam wavefront. A reconstructor is used to generate a surface representative of the phase relationship of the beam wavefront, and a deformable mirror is used to generate a compliment of the surface generated by the reconstructor to provide a corrected beam. The deformable mirror typically includes a plurality of actuators positioned behind the mirror that act to deform the mirror at the desired locations to provide the compliment of the sensed wavefront to correct the phase. This process is performed many times a second depending on the particular application.

In one known system, a wavefront sensor measures the tilt of wavelets within the main optical beam at a plurality of locations across the beam wavefront to determine the tilt or slope of the beam wavefront. The article Fried, David L., "Least-square fitting a wave-front distortion estimate to an array of phase-difference measurements," J. Opt. Soc. Am., Vol. 67, No. 3, March, 1977, pgs. 370–375, discusses one of the first known techniques for providing tilt measurements of a beam wavefront. In one design, the light is directed through an array of lenslets that focus individual portions of the wavefront in the direction determined by their slope. Algorithms are then employed in a wavefront reconstructor that reconstruct the phase of the wavefront to correct the phase by minimizing the least squares error between the observed phase gradient (tilt) and its computed value.

Another other known technique for providing beam wavefront sensing includes determining intensity measurements of the wavefront using curvature sensors. The article Roddier, Francois, "Curvature Sensing and Compensation: A New Concept in Adaptive Optics," Applied Optics, Vol. 27, No. 7, Apr. 1, 1988, pgs. 1223–1225 provides one of the original discussions on determining curvature measurements of a beam wavefront. To determine the curvature intensity measurements, algorithms are employed to derive the curvature (Laplacian) of the phase of the wavefront directly by differences in ratios of the measured intensities of the wavefront. The phase is then recovered by solving Laplace's equation with the right hand side equal to the measured curvature.

The various optical systems used to reconstruct a beam wavefront to reduce or eliminate aberrations suffer from a number of drawbacks. For example, the wavefront sensor, beam reconstructor and deformable mirror used in these systems are typically very expensive devices that add significant cost to the overall optical system. Further, because the various actuator devices used to adjust the deformable mirror are limited in size, systems having larger optics typically cannot be accommodated by these wavefront reconstruction systems because of resolution limitations.

What is needed is a beam wavefront reconstruction system for correcting the phase of a beam wavefront that is less expensive than the known systems in the art, and can provide greater resolution. It is therefore an object of the present invention to provide such an optical system.

SUMMARY OF THE INVENTION

In accordance with the teachings of the present invention, an optical system for correcting wavefront aberrations of an optical beam is disclosed. In one embodiment, the beam is received by an entrance pupil, where a portion of the beam at the entrance pupil is coupled off of the main beam to be used as a reference beam. The reference beam is taken from a small enough portion of the main beam so that the temporal coherence of the reference beam wavefront is substantially in phase. The reference beam is amplified by a coherent optical amplifier, expanded and collimated. The main beam and the collimated reference beam are applied to a beam splitter that splits the main beam and the collimated reference beam into two separate beam paths, where the main beam and the reference beam traveling along a common path are coupled together. One optical path from the beam splitter is received by a detector array and the other optical path from the beam splitter is sent through a light valve. Those portions of the main beam and the reference beam that are more than 90 degrees out of phase with each other destructively interfere at the detector array. The outputs of the detectors in the array are measured by threshold electronics. The threshold electronics cause the light valve to attenuate the portions of the beam on the other path that represent the destructively interfering portions of the main beam and the reference beam, so those portions do not pass through the light valve. Therefore, only those portions of the main beam that are within 90° in phase with the reference beam continue on through the receiver optics.

In an alternate embodiment, the output beam is used as the reference beam in a closed loop manner. Further, in yet another embodiment of the present invention, the coherent optical amplifier is eliminated, and the beam splitter is an unbalanced beam splitter so that the magnitude of the main beam and the reference beam at the detector array is substantially equal.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to an optical system for reducing or eliminating aberrations in a beam wavefront is merely exemplary in nature, and is in no way intended to limit the invention or its applications or uses. The optical system of the present invention has application for coherent light beams in different optical systems, such as communication systems, imaging systems, sensing systems, etc. However, the optical system of the invention may also have application for other types of systems not specifically identified herein.

Figure 1:
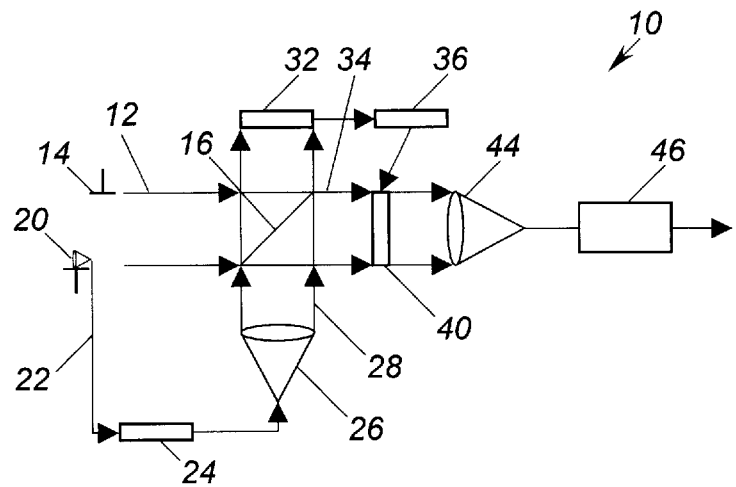
FIG. 1 is a schematic plan view of an open loop optical system for reducing aberrations in a beam wavefront, according to an embodiment of the present invention.

FIG. 1 is a schematic plan view of an optical system 10 for correcting wavefront aberrations in a light beam. The optical system 10 may be part of receiver optics in an optical communications system. A main light beam 12 from a coherent optical source (not shown), such as a coherent laser, enters the system 10 through an entrance pupil 14 and impinges a beam splitter 16. The beam 12 has traveled through a particular medium, such as air, and therefore is corrupted by wavefront distortions as a result of matter within the medium.

A small reference aperture 20 is positioned in the entrance pupil 14 and couples out a reference beam 22 from the main beam 12. The reference aperture 20 can be any optical coupler, such as a combination lens and fiber optic cable, suitable for the purposes described herein. The reference beam 22 is taken from a very small portion of the light beam 12. Therefore, the wavefront of the reference beam 22 will be substantially temporal coherent, and will not suffer from the larger scale aberrations in the main beam 12.

Because the reference beam 22 is taken from only a small portion of the main beam 12, it has a low intensity. Therefore, the reference beam 22 is sent to a coherent optical amplifier 24 that amplifies the reference beam to an intensity close to that of the main beam 12. The optical amplifier 24 can be any suitable optical amplifier known in the art, such as a fiber amplifier, that provides amplification of a coherent light beam for the purposes discussed herein. The reference beam 22 propagates along any suitable fiber optic cable, such as a single-mode fiber. The amplified reference beam 22 is then applied to a lens 26 that expands and collimates the beam 22 into a collimated reference beam 28. The collimated beam 28 is applied to an opposite side of the beam splitter 16 as the main beam 12, as shown.

A portion of the main beam 12 is reflected off of the beam splitter 16 and impinges a detector array 32, and the remainder of the beam 12 passes through the beam splitter 16. Likewise, a portion of the collimated reference beam 28 passes through the beam splitter 16 and impinges the array 32, and the remainder of the collimated reference beam 28 is reflected off the beam splitter 16. Therefore, the portion of the main beam 12 that is reflected from the beam splitter 16 and the portion of the collimated reference beam 28 that passes through the beam splitter 16 combine at the detector array 32. The portion of the main beam 12 that passes through the beam splitter 16 and the portion of the collimated reference beam 28 that is reflected from the beam splitter 16 combine as an output beam 34 of the system 10. The distance that the main beam 12 and the reference beam 22 propagate through the system 10 is selected so that they are appropriately aligned at the detector array 32.

The detector array 32 can be any detector array suitable for the purposes described herein, and in one embodiment will include a plurality of charged coupled devices (CCDs). The detector array 32 will employ different types of detectors depending on the wavelength of the light beam 12. Different portions of the combined main beam and the collimated reference beam will impinge different ones of the CCDs. The individual CCDs detect the magnitude of the combined main beam and collimated beam, and provide a voltage signal indicative of this intensity to threshold electronics 36. Those parts of the wavefront of the combined main beam 12 and the collimated reference beam 28 that are more than 90° out of phase with each other will destructively interfere. The particular CCD aligned with the destructively interfering portions of the wavefront will thus provide a low intensity measurement. Because the reference beam 22 is a representation of the main beam 12, but having wavefront coherence, those parts of the wavefront of the main beam 12 that destructively interfere with the collimated reference beam 28 identify aberrations in the beam wavefront. Therefore, the threshold electronics 36 will generate an output signal representative of the portions of the main beam 12 that are not in phase with other portions of the main beam.

The output beam 34 is applied to a light valve 40. The light valve 40 receives an output signal from the threshold electronics 36 which causes the light valve 40 to block or attenuate those portions in the combined output beam 34 where the main beam 12 and the collimated reference beam 28 destructively interfere. In other words, the output signal from the threshold electronics 36 identifies the locations in the wavefront of the combined output beam 34 where the main beam 12 and the reference beam 28 destructively interfere, thus identifying those portions in the main beam 12 that are out of phase with other portions in the main beam 12. Therefore, the portion of the output beam 34 that passes through the light valve 40 will be significantly in phase with each other. The light valve 40 can be any light valve suitable for the purposes described herein, such as a liquid crystal display (LCD) or a micro electromechanical (MEM) device, that can be selectively controlled to pass portions of a beam and block other portions of the beam. The resolution of the system 10 is defined by the number of detector elements in the detector array 32 and the ability of the light valve 40 to block those detected portions.

The output beam 34 is then applied to focusing optics 44 that focuses the beam onto an amplifier/detector 46 to be further processed by the receiver. Although the light valve 40 is passing one-half of the light 34, the phase of the passed light is not all the same (only within +/−90°). Focusing this light results in a spot with about 10% of the original beam 12 energy, which is enough for many applications.

Figure 2:
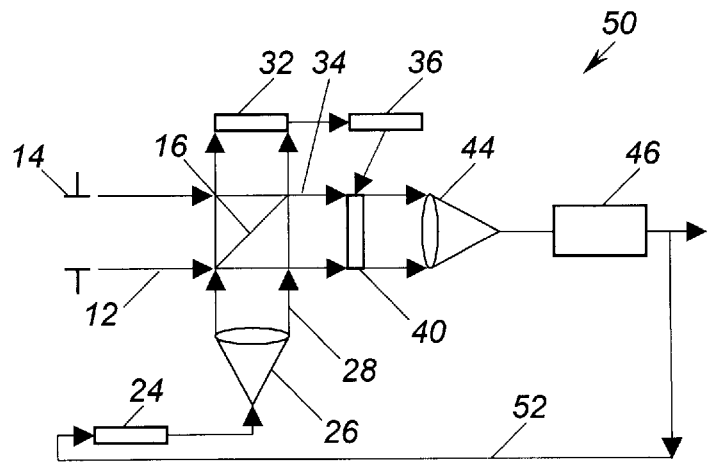
FIG. 2 is a schematic plan view of a closed loop optical system for reducing aberrations in a beam wavefront, according to another embodiment of the present invention.

The optical system 10 discussed above has an open loop configuration where the reference beam 22 is part of the main beam 12 before it enters the system 10. In an alternate embodiment, the reference beam 22 can be generated from the output beam 34 in a closed loop configuration. FIG. 2 shows a schematic plan view of an optical system 50 similar to the optical system 10, having the closed loop configuration. In this embodiment, like reference numerals are labeled the same, and operate in the same manner.

In this embodiment, the reference aperture 20 has been eliminated, and a reference beam 52 is coupled from an output of the amplifier/detector 46. Because the output beam from the amplifier/detector 46 will have wavefront temporal coherence because of the operation of the system 52, a portion of this beam can be used as the reference beam. This closed loop technique provides a more accurate technique for wavefront correction, but there may be initial difficulty providing the phase matching at start-up.

Figure 3:
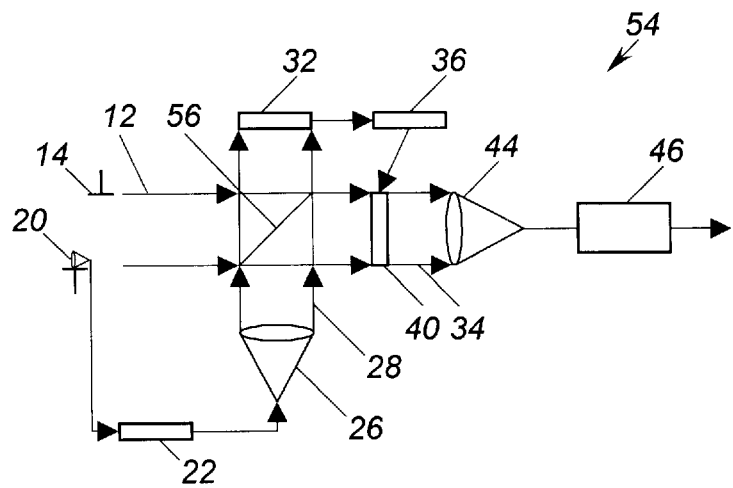
FIG. 3 is a schematic plan view of an optical system for reducing aberrations in a beam wavefront, according to another embodiment of the present invention.

FIG. 3 is a schematic plan view of an optical system 54 similar to the optical system discussed above, according to another embodiment of the present invention. Like reference numerals to that of the optical system 10 are labeled the same and operate in the same manner. In this embodiment, the amplifier 24 has been eliminated. Because the intensity of the main beam 12 and the collimated reference beam 28 needs to be about the same at the detector array 32, the beam splitter 16 is replaced with a beam splitter 56 that is unbalanced. Because the collimated reference beam 28 has a low intensity, the unbalanced beam splitter 56 will be configured so that most of the intensity of the collimated reference beam 28 passes through the splitter 56, and only a small portion of the main beam 12 is reflected by the beam splitter 56. The amplifier 24 can also be eliminated in the closed loop configuration, where the output beam 34 would be applied directly to the beam splitter 56.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. An optical system for providing wavefront phase correction of an optical beam, said system comprising:
    a beam splitter having a first side and a second side where the first side of the beam splitter receives the optical beam and the second side of the beam splitter receives a reference beam, said reference beam being a representation of the optical beam having beam wavefront coherence, said beam splitter splitting the optical beam and the reference beam so that a first portion of the optical beam and a first portion of the reference beam are combined and propagate along a first optical path and a second portion of the optical beam and a second portion of the reference beam are combined and propagate along a second optical path;
    a detector array positioned in the first optical path and receiving the first portion of the optical beam and the first portion of the reference beam, said detector array including a plurality of detectors providing output signals indicative of destructive interference between the optical beam and the reference beam;
    threshold electronics responsive to the output signals from the detector array and generating output signals indicative of locations in the wavefront of the optical beam of the destructive interference between the optical beam and the reference beam; and
    a light valve positioned in the second optical path and receiving the second portion of the optical beam and the second portion of the reference beam, said light valve being responsive to the output signals from the threshold electronics, said light valve attenuating portions of the combined second portion of the optical beam and the reference beam that destructively interfere with each other.

2. The system according to claim 1 wherein the reference beam is a portion of the optical beam coupled from the optical beam prior to the optical beam impinging the beam splitter.

3. The system according to claim 1 wherein the reference beam is a portion of the combined beam that passes through the light valve.

4. The system according to claim 1 further comprising a coherent optical amplifier, said coherent optical amplifier being responsive to the reference beam and amplifying the reference beam to a magnitude substantially equal to the magnitude of the optical beam.

5. The system according to claim 1 further comprising reference beam expanding optics for expanding the reference beam prior to the reference beam impinging the beam splitter.

6. The system according to claim 1 wherein the beam splitter is an unbalanced beam splitter and the optical beam and the reference beam have different beam intensities, said beam splitter splitting the optical beam and the reference beam so that the intensity of the optical beam and the reference beam on the first optical path is substantially equal.

7. The system according to claim 1 wherein the light valve is selected from the group consisting of liquid crystal displays and micro electro-mechanical devices.

8. An optical system for reconstructing a wavefront of an optical beam, said system comprising:
    a beam splitter having a first side and a second side where the first side of the beam splitter receives the optical beam, said first side of the beam splitter receiving the optical beam and splitting it into a first portion of the optical beam that propagates along a first optical path and a second portion of the optical beam that propagates along a second optical path;
    a reference beam generator generating a reference beam as a representation of the optical beam having beam wavefront coherence;
    reference beam expanding optics responsive to the reference beam and expanding the reference beam, said second side of the beam splitter receiving the expanded reference beam and splitting the reference beam so that a first portion of the reference beam is combined with the first portion of the optical beam and propagates along the first optical path and a second portion of the reference beam combines with the second portion of the optical beam and propagates along the second optical path;
    a detector positioned in the first optical path and receiving the combined first portion of the optical beam and the first portion of the reference beam, said detector providing measurements of locations in the wavefront of the optical beam that are out of phase with other locations in the wavefront of the optical beam; and
    a light valve positioned in the second optical path and receiving the combined second portion of the optical beam and the second portion of the reference beam, said light valve attenuating those locations of the optical beam that are out of phase with the other locations of the wavefront of the optical beam.

9. The system according to claim 8 wherein the detector provides a measurement of locations in the wavefront where the optical beam and the reference beam destructively interfere.

10. The system according to claim 8 wherein the reference beam generator includes an optical coupler positioned within an entrance aperture of the system, said optical coupler coupling out a portion of the optical beam prior to the optical beam impinging the beam splitter.

11. The system according to claim 8 wherein the reference beam generator includes a coupler that couples a portion of the combined second portion of the optical beam and the second portion of the reference beam after it passes through the light valve.

12. The system according to claim 8 wherein the reference beam generator further includes a coherent optical amplifier, said coherent optical amplifier amplifying the reference beam prior to the reference beam being expanded by the reference beam expanding optics.

13. The system according to claim 8 further comprising threshold optics responsive to electrical signals from the detector and generating output signals indicative of locations in the wavefront of the optical beam of destructive interference between the optical beam and the reference beam.

14. The system according to claim 8 wherein the beam splitter is an unbalanced beam splitter and wherein the optical beam and the reference beam have different beam intensities, said unbalanced beam splitter splitting the optical beam and the reference beam so that the intensity of the optical beam and the reference beam on the first optical path are substantially equal.

15. A method of providing wavefront phase correction of an optical beam, said method comprising the steps of:
   directing the optical beam onto a first side of a beam splitter;
   splitting the optical beam into a first optical path and a second optical path;
   directing a reference beam onto a second side of the beam splitter, said reference beam being a representation of the optical beam having wavefront coherence;
   splitting the reference beam into the first optical path and the second optical path;
   detecting locations in the wavefront of the optical beam where the optical beam and the reference beam destructively interfere in the first path; and
   attenuating the locations in the optical beam that destructively interfere with the reference beam in the second path to provide a corrected optical beam.

16. The method according to claim 15 further comprising the step of amplifying the reference beam to an intensity about the same as the optical beam.

17. The method according to claim 15 further comprising the step of expanding and collimating the reference beam prior to splitting the reference beam.

18. The method according to claim 15 wherein the step of generating a reference beam includes coupling off a portion of the optical beam prior to splitting the optical beam.

19. The method according to claim 15 wherein the step of generating the reference beam includes coupling off a portion of the corrected optical beam.

20. The method according to claim 15 wherein the step of attenuating locations in the optical beam including passing the optical beam through a light valve.

* * * * *